(12) United States Patent
Boyer

(10) Patent No.: US 8,354,918 B2
(45) Date of Patent: Jan. 15, 2013

(54) LIGHT, SOUND, AND MOTION RECEIVER DEVICES

(76) Inventor: Stephen W. Boyer, Los Angeles, CA (US)

( * ) Notice: Subject to any disclaimer, the term of this patent is extended or adjusted under 35 U.S.C. 154(b) by 542 days.

(21) Appl. No.: 12/546,171

(22) Filed: Aug. 24, 2009

(65) Prior Publication Data

US 2010/0052864 A1  Mar. 4, 2010

Related U.S. Application Data

(60) Provisional application No. 61/170,924, filed on Apr. 20, 2009, provisional application No. 61/092,971, filed on Aug. 29, 2008.

(51) Int. Cl.
*H04Q 5/22* (2006.01)
*H04Q 1/30* (2006.01)
*G08B 5/22* (2006.01)

(52) U.S. Cl. ............ 340/10.1; 340/10.5; 340/7.53; 340/539.1

(58) Field of Classification Search ........ 340/10.1–10.5, 340/7.53, 7.23, 539.1; 446/454, 175, 265; 700/246; 84/645, 104; 704/270, 272
See application file for complete search history.

(56) References Cited

U.S. PATENT DOCUMENTS

| | | | |
|---|---|---|---|
| 4,840,602 A | 6/1989 | Rose | |
| 5,270,480 A * | 12/1993 | Hikawa | 84/645 |
| 5,705,995 A * | 1/1998 | Laflin et al. | 340/7.48 |
| 5,784,001 A * | 7/1998 | Deluca et al. | 340/7.56 |
| 6,089,942 A | 7/2000 | Chan | |
| 6,110,000 A | 8/2000 | Ting | |
| 6,160,986 A * | 12/2000 | Gabai et al. | 434/308 |
| 6,246,927 B1 * | 6/2001 | Dratman | 700/246 |
| 6,375,535 B1 | 4/2002 | Fong et al. | |
| 6,454,625 B1 | 9/2002 | Fong et al. | |
| 6,491,566 B2 | 12/2002 | Peters et al. | |
| 6,497,606 B2 | 12/2002 | Fong et al. | |
| 6,551,165 B2 | 4/2003 | Smirnov | |
| 6,631,351 B1 * | 10/2003 | Ramachandran et al. | 704/270 |
| 6,682,390 B2 * | 1/2004 | Saito | 446/268 |
| 6,729,934 B1 | 5/2004 | Driscoll et al. | |
| 6,822,154 B1 | 11/2004 | Thai | |
| 6,917,281 B1 * | 7/2005 | Goldberg | 340/7.53 |
| 7,043,694 B2 * | 5/2006 | Miller et al. | 715/764 |
| 7,059,933 B1 | 6/2006 | Hsiao et al. | |
| 7,068,941 B2 | 6/2006 | Fong et al. | |
| 7,137,862 B2 * | 11/2006 | Arnold | 446/445 |
| 7,184,423 B2 | 2/2007 | Bryan et al. | |
| 7,252,572 B2 | 8/2007 | Wright et al. | |
| 7,297,044 B2 * | 11/2007 | Small et al. | 446/454 |
| 8,027,280 B2 * | 9/2011 | Ganesh | 370/310 |
| 2002/0077021 A1 * | 6/2002 | Cho et al. | 446/265 |
| 2004/0198158 A1 | 10/2004 | Driscoll et al. | |
| 2007/0127429 A1 | 6/2007 | Bryan et al. | |
| 2007/0275634 A1 | 11/2007 | Wright et al. | |

\* cited by examiner

*Primary Examiner* — Nam V Nguyen
(74) *Attorney, Agent, or Firm* — Levenfeld Pearlstein, LLC

(57) ABSTRACT

A method to elicit a behavior in response to a simplex communication signal comprises receiving, at a receiver device, an encoded simplex communication signal from a transmitter device, the simplex communication signal including an identifier. The method further comprises referencing a stored program in the receiver device to a stored program block corresponding to the identifier. The receiver device then initiates execution of the program block and renders a behavior in accordance with or corresponding to the program block corresponding to the simplex communication signal. The receiver device includes a program database, wherein the receiver is programmed to reference a stored program block of the program database corresponding to the identifier. The receiver device also includes mechanisms to enable a behavior in accordance with the program block to be audibly and visibly perceived.

12 Claims, 4 Drawing Sheets

LIGHT, SOUND, AND MOTION RECEIVER DEVICES

CROSS-REFERENCE TO RELATED APPLICATIONS

This application claims the benefit of priority of Provisional U.S. Patent Application Ser. No. 61/092,971, filed Aug. 29, 2008, entitled "Light, Sound, and Motion Synchronized Ensemble Units" and U.S. Patent Application Ser. No. 61/170,924, filed Apr. 20, 2009, entitled "Light, Sound, and Motion Synchronized Ensemble Units".

BACKGROUND OF THE INVENTION

The present invention is directed to devices such as toys and dolls, synchronized accessories, ornaments and the like. More particularly, the present invention pertains to devices displaying various behaviors in response to transmitted signals, and synchronizing the behaviors of a plurality of such devices.

Both children and adults enjoy playing with items that stimulate the senses. Very popular are toys, figures, or devices which creatively relay visual or audio stimulation and engage the user's imagination or which are configured to soothe.

With increases in technology, electronic devices have become increasingly complicated and expensive. Synchronizing the behavior of independent devices is usually approached through various network topologies that require handshaking protocols to avoid signal crashes and to establish the presence of new devices as they enter the network. Networks which establish connections in real-time as new devices are brought in and out of the network are called 'ad-hoc' mesh networks. There are several standards emerging for ad-hoc networking (for example, BlueTooth), but other standards are emerging.

While these technologies provide powerful tools for devices to communicate with each other, they are also expensive, unwieldy and require sophisticated interaction algorithms. There is also a limit to the number of devices that can connect to such a network as performance can become sluggish as the number of devices in the network increases.

Synchronizing the behavior of electronic devices has been a long-desired feature in the toy industry, as well as other industries, and there have been many attempts to create meaningful interaction between independent devices. Most of these have been hindered by the same issues that make ad-hoc networking so complicated and more sophisticated ad-hoc networks mentioned above are typically cost-prohibitive.

Accordingly, there is a need for a less complicated device capable of sophisticated behaviors and easy and inexpensive to manufacture.

BRIEF SUMMARY OF THE INVENTION

Individual, self-contained devices, such as toys including furry balls, beach balls, plastic figures, dolls, action figures, stuffed animals, cars, trucks, decorations, accessories, ornaments, and the like, respond to simplex communication signals and produce behavioral responses that can be perceived as light, sound, and/or motion. Such device may be perceived to act in synchronization when placed in proximity to other devices having similar capabilities.

A system for eliciting one or more behavioral responses in a plurality of receiver devices in response to a simplex communication signal from a transmitter device includes a transmitter device, and one or more receiver devices. The transmitter device is configured for transmitting a simplex communication signal that includes an identifier. A first receiver device is configured to receive the simplex communication signal, to reference a program block, and to perform a behavior in response to the simplex communication signal. If a second receiver device is also present, the second receiver device is configured to also receive the same simplex communication signal, to reference a program block, and to perform a behavior in response to the simplex communication signal. In the present system, the behavior of the first receiver may be different from the behavior of the second receiver in response to the simplex communication signal. In another embodiment, a second receiver device receives the simplex communication signal, including the identifier(s), and references to a program block different from the program block of the first receiver device.

A method to enable a physical response or behavior in a receiver device in response to a simplex communication signal includes receiving, at the receiver device, an encoded simplex communication signal from the transmitter device. As used herein, a simplex communication signal refers to one-way communication where signals flow in one direction and which can include, but is not limited to a one-way report or broadcast of events, such as a clock pulse, time code, cue numbers, or other type of information capable of being transmitted through wires or wirelessly. The events may be algorithmically generated by the transmitter device, pre-programmed by a programmer, and/or based on events from another source such as sensors, internet data streams, or user controlled events. The one way signal of the present system includes, in general, an identifier, which may include an event identifier and a program identifier.

The method further comprises referencing a stored program in the receiver device to a stored program block corresponding to the identifier. The receiver device then runs or executes the program of the program block in response to the simplex communication signal and renders a behavior corresponding to the program block.

The receiver device includes a program database, wherein the receiver is programmed to reference a stored program block of the program database corresponding to the identifier. A second receiver device, in one embodiment, receives the communication signal including the identifier and references a program block different from the program block of the first receiver device. In response to the simplex communication signal, the first and second receiver devices execute the corresponding program block in their respective repertoires. When the program block is executed, the receiver devices exhibit behaviors which can be audibly or visually perceived. Such behaviors can include, but are not limited to speaking, singing, chanting, yelling, dancing, walking, wiggling, marching, illuminating, gesturing, gesticulating, and the like. In one embodiment, the first receiver device behavior is coordinated with the behavior of the second receiver device. The receiver device may receive the signals periodically or aperiodically via wired or wireless connections.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
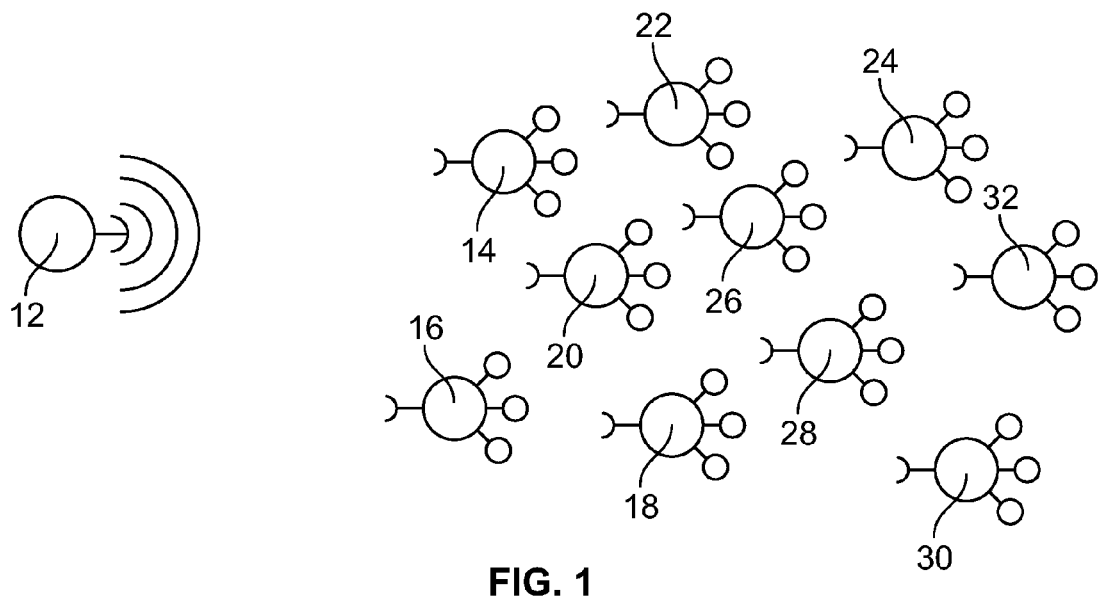
FIG. 1 is a diagram of a transmitter device and receiver devices in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Individual, self-contained receiver devices, such as toys, furry balls, beach balls, plastic figures, and the like, as well as communication devices having audio and video capability, behave in, for example, light, sound, and/or motion synchronization when placed in broadcast range of a transmitter device, such as a computer, satellite, or other transmitter device. Multiple receiver devices may, for example, join together in song, generate an animating light pattern, or appear to engage in team sports activities (throwing and catching a ball, for example). Each receiver device may have its own character, voice, and musical part (e.g., soprano, alto, tenor, or bass). The transmitter/broadcaster, hereafter "transmitter device" broadcasts an encoded, simplex communication signal. A simplex communication signal is a one-way communication which may include, but is not limited to an IR, RF, audio, or light communication signal of an event of the transmitter device. An event may be a clock pulse, a timecode, cue numbers, or any other type of digital signal information. In addition, a "behavior" or a "behavorial response", used interchangeably herein, refers to any action or response of the receiving device in response to stimuli, in the present invention, a communication signal.

A receiving device receives the simplex communication and references a program in response to the simplex communication signal. Neither the receiver device nor the transmitter device need have knowledge of each other or specific information regarding each other; they are blind to each other, negating the need for handshaking protocols and the like. The present method and system uses a broadcast model of communication. Only one transmitter device transmits a signal, and all receiver devices are capable of receiving. Thus, communication is one-way, also known as simplex communication. Transceivers (combination transmitter receivers) are not necessary, although it is contemplated that such devices may be used. The multiple receiver devices remain in synch over both short and long periods of time, and the simplex communication signal, the output of the receiver devices, and the effective synchronization do not degrade in performance as more receiver devices are added. Receiver devices may join in at various time during the transmitted signal and perform the behaviors according to the identifier received at that time.

In addition to being blind to the transmitter device, the receiver devices are blind to each other as well. The individual receiver devices receive the same simplex communication signal, but may express different behaviors in response to the transmitted communication signal depending on its individual programming. The behaviors of the receiver devices, in one embodiment, even though different, create the illusion of synchronized or choreographed play or interaction with each other. For example, a response may include musical or verbal responses, light shows, and/or movement of the receiver device. It is also contemplated that such physically-perceived responses may include smells, textures, and tastes. For purposes of the present disclosure, "physically-perceived" means the behavioral response of the receiver device can be sensed by the user audibly, visibly, or otherwise.

Referring now to the figures and in particular FIG. 1, there is shown a transmitter device 12 and multiple receiver devices 14, 16, 18, 20, 22, 24, 26, 28, 30, and 32. The receiver devices 14-32 are positioned anywhere within the transmission field of a transmitter device, such as transmitter device 12. It will be appreciated that the transmitter device may be a device resembling the receiver devices, such as physically resembling one or more of the receiver devices, or may be a computer device or any other device capable of or configured for transmitting communication signals. In a present embodiment, a transmitter device is a device used to broadcast a communication signal of an event. The transmitter device 12 may be a stand-alone device; i.e., it may be capable of producing visual, audio, or other behaviors individually. In a preferred embodiment, one or more receiver devices 14-32 are used in conjunction with the transmitter device 12.

Figure 2:
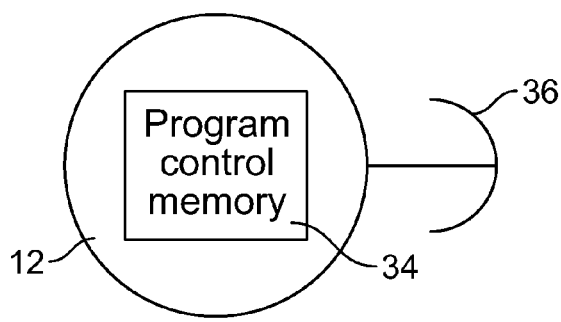
FIG. 2 is a diagram of a transmitter device with a wireless transmitter and master program signal control.
Figure 3A:
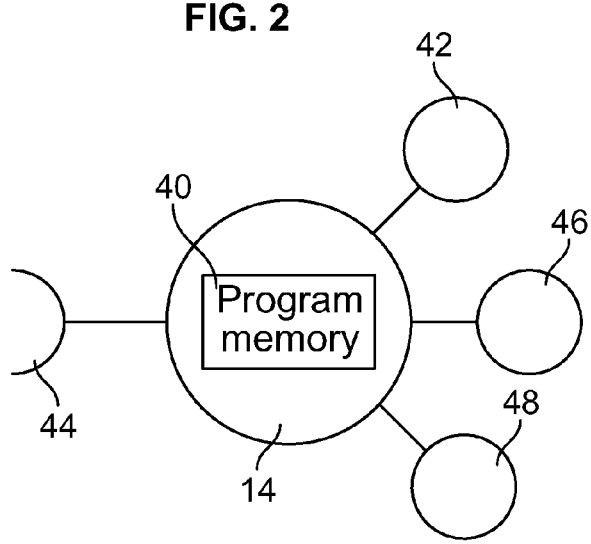
FIGS. 3a and 3b illustrate receiver devices containing a wireless receiver and output devices for behavioral responses.
Figure 3B:
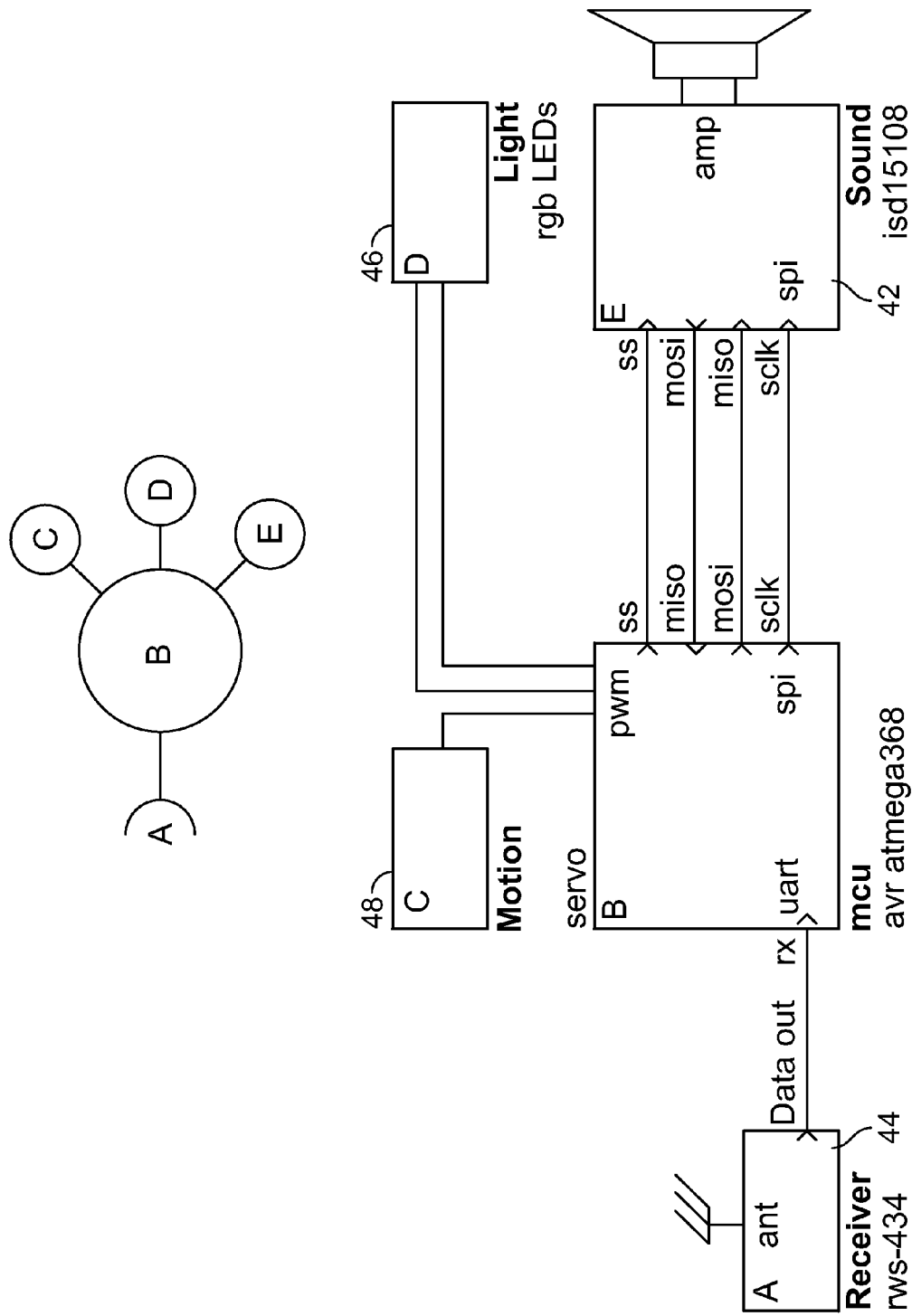

Turning now to FIGS. 2 and 3, the transmitter device 12 has a wireless transmitter 36 which emits one or more of an IR (infrared), RF (radio frequency) or other communication stream of signal with a regular/periodic, irregular/aperiodic, or predetermined rhythm. Individual receiver devices 14-32 have receivers 44 that correspond to the transmission signal type, (e.g., IR, RF, audio, visual, and the like). When the individual receiver devices are in wireless transmission proximity to (in broadcast range of) the transmitter device 12, and the transmitter device 12 is active, the individual receiver devices 14-32 each receive the transmitted signal of the event and become active automatically. Alternatively, the system could be made using wired connections, such that the signal of the event is transmitted on a signal bus that each receiver device monitors.

A single, preferably wireless, transmitter in the transmitter device 12 emits pulses of signal stored in its program control memory 34. Such a signal may or may not be encoded. The transmitter device transmits a series of preferably wireless communication signals with timing/time stamps and program identifiers to "synchronize" sound, light, and motion in the receiver devices 14-32.

Each receiver device 14-32 has one or more of sound output(s) 42, light output(s) 46, motion output(s) 48, or other outputs such that its behaviors may be physically perceived.

Each receiver device 14-32 decodes the signal in order to determine its respective individual behavior. For example, receiver device 14 may decode the signal and, in response to the identifier, perform a visual light show while receiver device 16 may decode the signal and in response perform a portion of a song. The same identifier provokes a different behavioral response in each of the receiver devices based on the program blocks in the individual receiver devices.

The encoded communication signal includes an identifier which may include an identifier of the program ("program identifier"), an event identifier, and/or other signal identifiers necessary for receiver devices to interpret the communication signal at any time during the transmission. In one embodiment, the signal 50, in a present embodiment, is a 16-bit value emitted at regular/periodic or irregular/aperiodic intervals. It will be appreciated that other digital signal configurations for communicating data may also be used. In one example, the 16-bit value transmitted includes a program identifier of the program, such as a song, to be executed and a an event identifier, such as a beat identifier, that increments with each time interval t.

A receiver device is "silent" or inactive until it recognizes a valid signal. The validity of the signal may be determined by the program identifier discussed above, by identification of the transmitter device, or by other mechanisms of signal verification. After the receiver device verifies the validity of a signal, the receiver device references the receiver device's program list (FIG. 4) for the program of the program block and time that is associated with or indicated by the signal.

A program is formed from one or more program blocks, 400. A program block includes one or more program data mini-blocks, 402. Program data mini-blocks 402 are stored locally in a program database 404 on each receiver device. Program data mini-blocks 402 are referenced indirectly so that each mini-block can be reused within a program block and/or across multiple programs within the program database 404. This is an especially useful feature for storing music: repeating patterns may be stored extremely efficiently and reused. Each receiver device has a section of signal memory that contains its raw source material, i.e., the program mini-blocks. The signal memory, in one embodiment, is referenced and stored sequentially according to time code.

Figure 4:
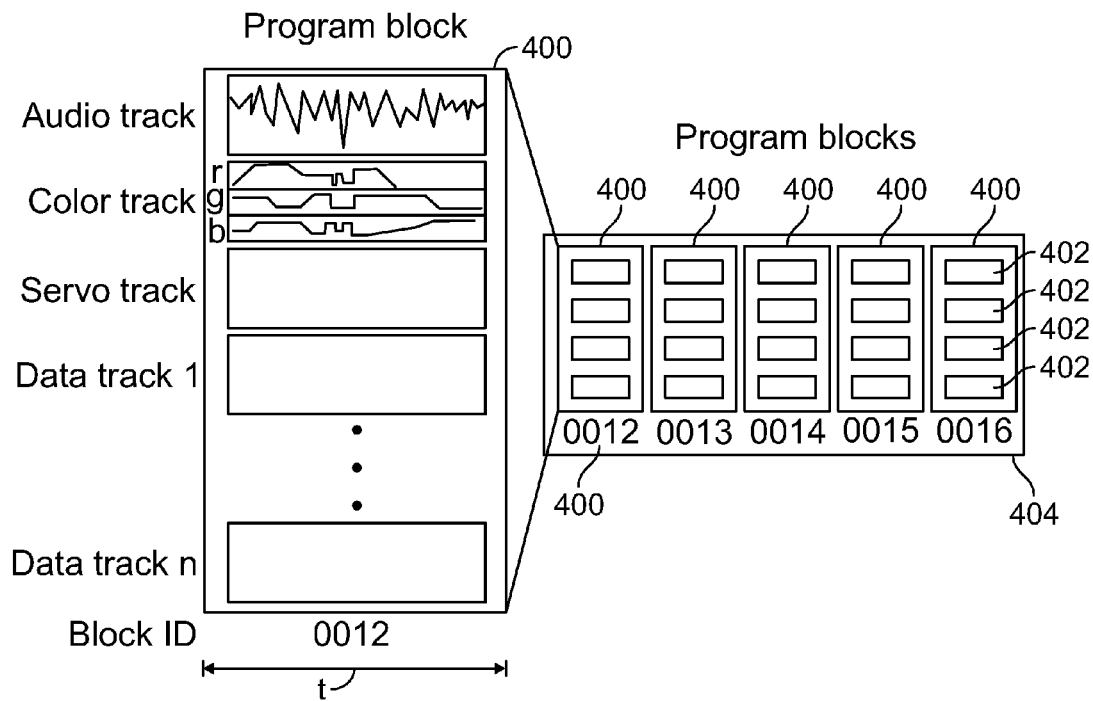
FIG. 4 is a diagram of a receiver device program list.
Figure 5:
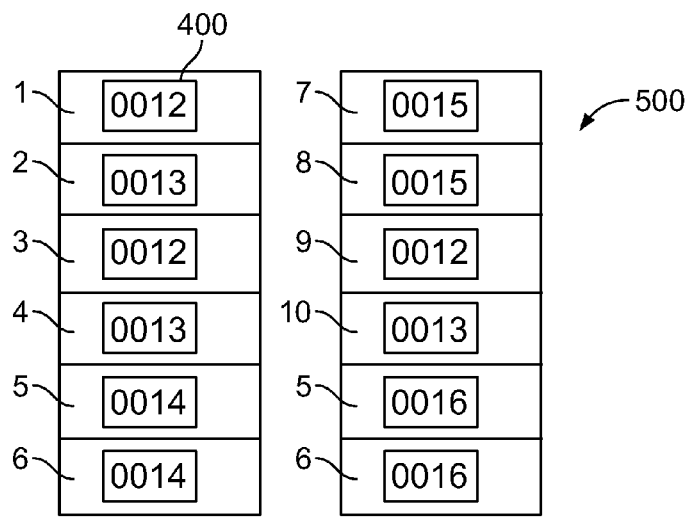
FIG. 5 is a diagram of a transmitter device transmissions.
Figure 6:
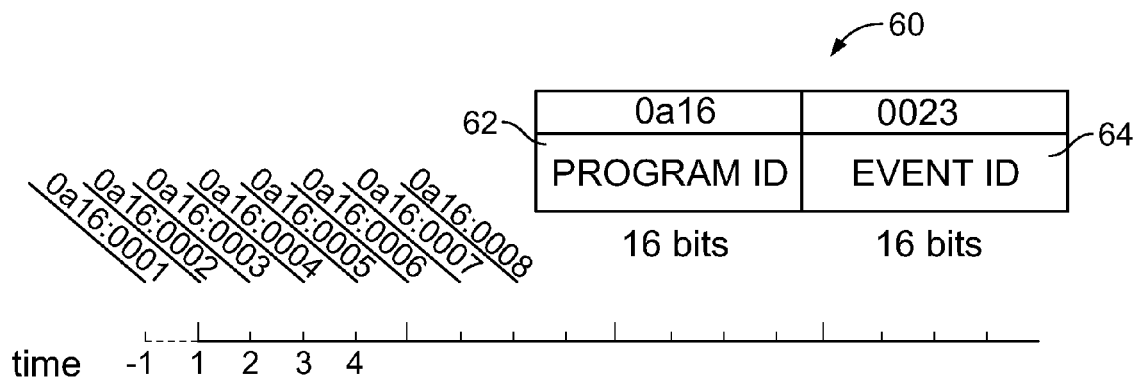
FIG. 6 is a diagram of the program blocks for the receiver device of FIG. 2.

FIGS. 4, 5, and 6 illustrate an example of how the transmitter device 12 and the receiver devices 14-32 interrelate. The transmitter device 12 and the receiver devices 14-32 each have multiple programs 400 stored within its memory/program database 404. A program (and thus, the program blocks and mini-blocks) may be composed of music, light, sound, motion, or other programs. Each program block in each of the receiver devices is stored in memory (shown generally at 500), and in one embodiment, stored arbitrarily.

The program database for receiver device 14 is shown in FIG. 5. For example, the receiver device 14 stores program block 0012 in memory block 1, program block 0013 in memory block 2, and so on. In contrast, receiver device 16 may store program block 0012 in memory block 7 and program block 0013 in memory block 3, while receiver device 18 stores program block 0012 in memory block 5 and program block 0013 in memory block 9. Some programs and corresponding program blocks may be stored in more than one memory block and some programs and/or program blocks may be added, subtract, or not present altogether from the receiver device's program database.

The transmitter transmits the communication signal 60 shown in FIG. 6 with the identifier, which indicates to the receiver devices which memory block to access and thus, which program block to perform. In FIG. 6, the identifier includes a program identifier 62 and an event identifier 64. As disclosed above, because the receiver devices may store program blocks 400 at different memory blocks 500, the program block each individual receiver device performs in response to signal 60 may be different.

In one embodiment, in order to minimize latency, the identifier transmitted will be for the program following a sent identifier. That is to say, the transmitter device will broadcast a first identifier and the receiver devices, having successfully received the first identifier will cue their memory block and begin executing the program block for the appropriate memory block when it receives the next identifier or signal pulse. This will also allow the receiver devices to double buffer their program data, loading the next needed program block into the buffer as the current buffer is playing. Another advantage is that it allows time for transitions, such as fade-ins and fade-outs, and have programs reserved for system communication signals.

In another embodiment, if a receiver device does not receive a signal as expected, the receiver device will assume the time code pulse was missed and automatically error-correct by queuing and playing the next sequential time block in its program memory. If several time code pulses are missed in a row, for example, if three signal pulses are not received, the receiver device will assume a loss of signal and fade out its audio or, if light or robotic, will enter a predefined sleep mode.

In one embodiment, a group identifier (ID) and a device ID are embedded in the transmitted signal. A full message ID will consist of an 8-bit group ID and an 8-bit device ID and other encoding as deemed appropriate. It is anticipated that a signal that is broadcast will be received by all receiver devices within the broadcast radius of the transmitter device, but that each receiver device, having its own individual device ID and group ID(s), will ignore or not respond to signals that do not include the receiver device's respective device or group ID.

The transmitter device may also, in another embodiment, 'teach' individual receiver devices programs by transmitting individualized program signals. The transmitter device may be updated with new programs via Internet, cell phone, memory card, or any other signal distribution method. Receiver devices need only learn programs or add program blocks to its program database from the transmitter device. Alternatively, each receiver device may be equipped with its own means of acquiring new programs via memory card, and the like. Additional new program blocks can be broadcast to each individual receiver device via, for example, onscreen optical encoding or by the transmitter device's transmitter.

The present invention simplifies the synchronization of the behavior of receiver devices by having only one transmitter device and multiple receiver devices and having preferably unidirectional or simplex communication. One of the many advantages to the present invention is that the rate of data transfer or bandwidth necessary is very low. In one embodiment, the rate of data transfer is one (1) byte per sec or eight (8) bits per second. Very little data needs to be transferred, thus, the rate of transfer is extremely low.

It will be appreciated that performance does not diminish with increasing number of receiver devices. The present invention allows for greater number of devices to join without loss of quality. Receiver devices each have their own program blocks so that new receiver devices enhance the overall experience. Light and motion effects, as well as music, can be distributed amongst a group of receiver devices.

Other embodiments include allowing the transmitter device signal to be controlled by a variety of interfaces including Internet signals, user gesture, and other control mechanisms.

Additionally, the synchronization is not limited to music. Speech, light, and robotic movement/animation may all be synchronized utilizing the present method so as to create for example, synchronized light shows, choreography, even the acting out of dialogue. Complex choreography can also be accomplished by synchronizing light, sound and electro-mechanical motion resulting in delightful interaction between all of the members of the collection.

The present method and system also creates the illusion of an ad-hoc mesh network in that receiver devices respond as soon as they are turned on or brought into the broadcast range of the transmitter device. Multiple receiver devices maintain synchronization with each other and can be made to appear to interact with each other when, in fact, the interaction is either pre-programmed into program blocks or takes place on a more sophisticated computer which then treats the interacting receiver devices as puppets by sending them signals for their behavior. Receiver devices can be added or subtracted and each automatically synchronizes its behavior with existing receiver devices.

The present method and system can be implemented in several ways. For example, the receiver device may be a communication device such as a mobile or portable phone, smart phone, or other communication device. In such an implementation one communication device becomes the transmitter device and other communication devices become the receiver devices. Once it has been established which communication device is the transmitter device and which are the receiver devices, the transmitter and receiver devices operate in the manner disclosed above. The transmitter device sends out all signal and synchronization data. Each receiver device merely listens for the signal/synchronization pulse and performs the 'measure' or program block that the transmitter device has requested. In the event that the designated transmitter device leaves the network, another device may be designated to replace the leaving transmitter device, allowing for smooth exit from and entry into the network.

Figure 7:
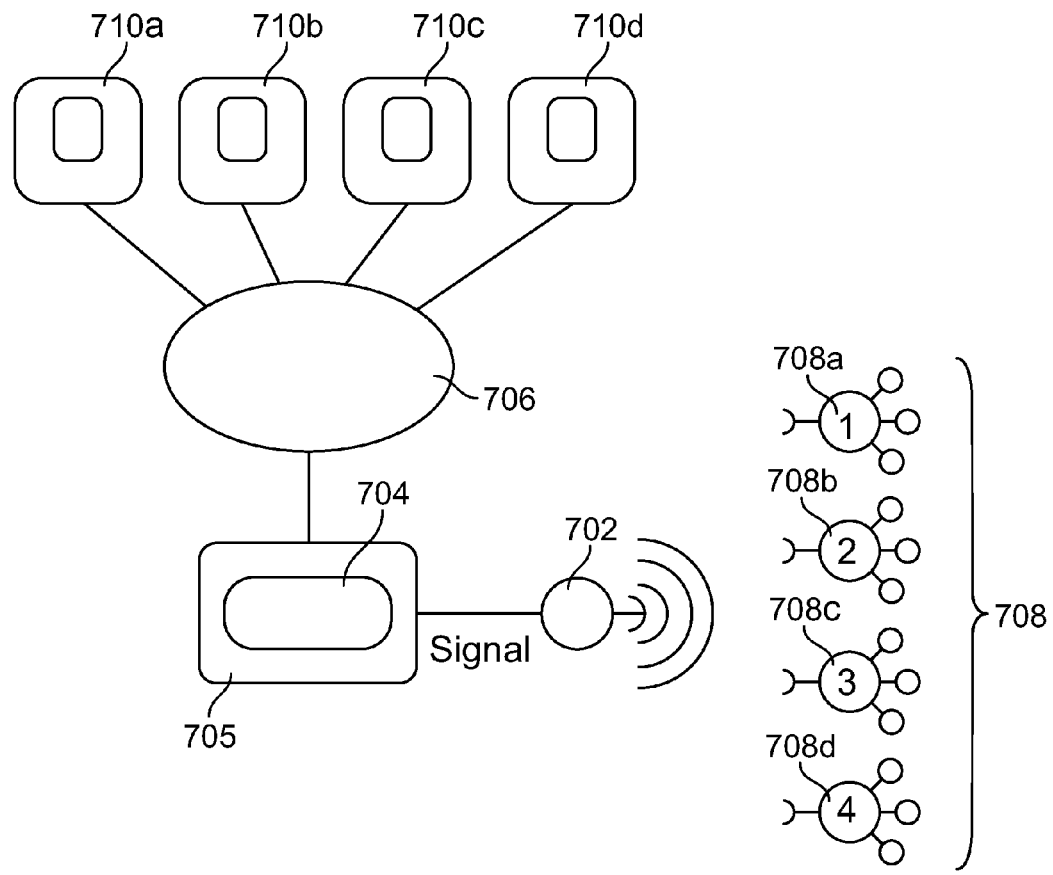
FIG. 7 is a diagram of an implementation of the an embodiment in accordance with the principles of the present invention.

A receiver device system and an internet or web-enabled application is illustrated in FIG. 7 in which the present method and system can be used to inexpensively interface multiple devices to data from cell phones, the internet, and computers by connecting the transmitter device to the Internet via either WiFi, USB or other communication method. Because the broadcaster/transmitter device is the only device that needs the additional hardware and software required to communicate with the computer (or other device) the receiver devices may receive data from the internet or other sources in the least expensive way possible.

In one example, as shown in FIG. 7, a transmitter device 702 receives information from information sources 710a-d. The information from the source 710a-d is transmitted over the Internet 706 through a compatible computer application 704 of the computer network. Signals may be sent aperiodically rather than periodically. The information sources 710a-d can download information which is interpreted and packaged in a usable form by the computer software 704. The transmitter device 702 downloads the signal from the computer 705 and transmits the signal wirelessly to all receiver devices 708a-d. The signal may be encoded with a unique receiver device ID. If the receiver device ID of the receiver device itself does not match the receiver device ID of the signal, the receiver device will ignore the signal. In other words, the receiver devices may be programmed to respond only to transmission from particular sources, for example, from information source 710d, and ignore information from source 710a-c.

In another example, the receiver device is a representation of a person, place, animal, thing, or character to be embodied in a physical receiver device that responds to transmitted commands over the Internet. For example, a celebrity or other information source 710a-d, may sell a receiver device which resembles him/herself (a receiver device character), for example, that is connected to or can receive communications from an on-line networking site. Using a online networking site application, the celebrity could select his mood, record a phrase, or other such gesture and transmit that gesture to all of the receiver device characters. When the purchasers of the receiver device characters open their individual on-line networking accounts, the receiver device character can download/receive the transmission. Or, in another example, a user might have at receiver device character on the user's desk that winks at him/her whenever a friend sends a 'wink' from his/her on-line social networking site account. In this examples, the transmitter device is the computer having the online networking site or can be a transmitter device connected to the computer and on-line networking site such that the transmitter device can download the signal and transmit it to the receiver device.

In another example, execution of a program block and associated behaviors can trigger synchronous behavior in other receiver devices. For example, video content encoded using a video codec can have time codes embedded in them so that communication signals may be transmitted at specific times during replay of the video. This allows receiver device "characters" to engage in conversation, sing or dance along with the video, laugh at jokes, or comment on the video. Video that is encoded with receiver device character information may be tagged as such so that receiver device character owners can easily find videos with which their particular receiver device characters will interact.

Alternatively, a separate software module could monitor the timing of video replay using, for example, a digital media player. An XML file, for example, (or other data file) stores the events/cues to be triggered by the video replay at specific times. The advantage to this technique is that there is no need to re-encode video and new synchronization data may be added to any preexisting video.

Other implementations of the present method and system are also contemplated. For example, electronically controlled wind chimes, which are activated by solenoids, can be synchronized with each other. Chimes may be packaged individually or in sets, with each set based on a certain tuning combination. It is anticipated that combinations of tones may be made by mixing tones. Chimes may respond to data or environmental conditions or ambient data. For example, chimes may increase activity during day and decrease at night. In another embodiment, chimes can change a "mood" or ambiance by changing which tones are active. Ambient data devices, such as chimes, fountains, LED fixtures, character figurines, home décor objects such as planters, etc. can be programmed to respond to transmitted signals.

In another implementation, holiday ornaments sing a different part of the same song in harmony with the others. A central or main ornament, such as a Star of David or an angel at the top of a Christmas tree, for example, serves as the transmitting device. Figurines sing and move in synch with each other to provide holiday music and sound effects appropriate to the season. Wreaths, stockings, candy canes, and other decorations often found in the home can also playback music in harmony so that the whole home (and exterior decorations as well) might all be part of the music.

In another implementation, home and business décor can be embedded with lighting that changes color synchronously with other objects. In another implementation of the present method and system, synchronized identifiers, such as wrist bands and/or other accessories for groups, such as school groups or tourist groups or other group type activity, are contemplated.

The present method and system may be used as a method for transmitting information to members of a group using synchronized accessories. For example, accessories such as wands, pins, wristbands, name cards, and the like may be synchronized. Similarly, synchronized accessories, as discussed above, can be used for concerts for transmitting information to members of a crowd such as in a concert or sporting event, and can synchronize flashing of light with live or pre-recorded music or video. In addition, the synchronized accessories can blink or flash or otherwise behave in synchronous fashion based upon game events—vibrate and flash when a favored team hits a home run for example or can blink and make sound in synchronization with stadium broadcast teasers and promotional events. It is also contemplated that smell, tactile, or other responses can be induced as receiver responses.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method to enable or elicit a behavioral response in a receiving device, the method comprising:
    transmitting from a transmitter device an encoded simplex communication signal;
    receiving, at a first receiver device different from the transmitting device, the encoded simplex communication signal, the simplex communication signal including an event identifier and a source identifier, the event identifier being an announcement of an event of the transmitting device, the source identifier identifying a source of the signal;
    determining whether the source identifier is valid, and if valid,
    referencing a stored program in the receiver device to a stored program block in response to the source identifier;
    initiating execution of the program block; and
    rendering a behavioral response corresponding to the simplex communication signal and the program block, the behavioral response being at least one of audible sound, physical movement and illumination,
    wherein the receiving device does not transmit a signal to the transmitting device.

2. The method of claim 1 wherein a second receiver device receives the simplex communication signal including the event identifier and the source identifier and references a program block different from the program block of the first receiver device.

3. The method of claim 2 wherein the behavioral response of the first receiver device is different from and coordinated with a behavioral response of the second receiver device.

4. The method of claim 1 wherein an Internet-based networking application is open on a web-enabled computer and the Internet-based networking application communicates the simplex communication signal to the receiver device through the transmitter device.

5. The method of claim 1 wherein the receiver device receives the signals via wired or wireless connections.

6. A receiver device that renders a behavior in response to a simplex communication signal sent from a transmitter, the receiver device comprising:
    a receiver configured to receive an encoded simplex communication signal having an event identifier and a source identifier, the event identifier being an announcement of an event of the transmitting device, the source identifier identifying a source of the signal, the receiver device being different from the transmitter;
    a program database, wherein the receiver is programmed to determine whether the source identifier is valid, and if valid, to reference a stored program block of the program database in response to the source identifier; and
    one or more mechanisms to enable a behavior corresponding to the program block referenced in response to the simplex communication signal, the behavior being at least one of, an audible sound, a physical movement and illumination,
    wherein the receiver device is not capable of transmitting a signal to the transmitter.

7. The device of claim 6 wherein the behavior corresponding to the program block is at least one of audible sound, physical movement, and illumination.

8. The device of claim 6 wherein a second receiver device receives the simplex communication signal including the event identifier and the source identifier, and references a program block different from the program block of the first receiver device.

9. The method of claim 6 wherein the behavior of the first receiver device is different from and coordinated with the behavior of the second receiver device.

10. A computer program product, comprising a computer usage medium having a computer-readable program code embodied therein, said computer readable program code adapted to be executed to implement a method to elicit a behavior in one or more receiver devices in response to a simplex communication signal transmitted by a transmitter device, the method comprising:
    receiving an encoded simplex communication signal at the one or more receiver devices from a transmitter device, the simplex communication having an event identifier and a source identifier, the event identifier being an announcement of an event of the transmitting device, the source identifier identifying a source of the signal, the one or more receiver devices being different from the transmitter device;
    determining whether the source identifier is valid, and if valid,
    referencing a stored program in the one or more receiver devices to a stored program block in response to the event identifier;
    initiating execution of the program block; and
    enabling the one or more receiver devices to render the behavior corresponding to the program block, the behavior being at least one of an audible sound, a physical movement and illumination,
    wherein the receiver device does not transmit a signal to the transmitter device.

11. The method of claim 10 wherein there are at least two receiver devices and wherein the behavior of the first receiver device of the one or more receiver devices is different from a behavior of a second receiver device of the one or more receiver devices.

12. A system for eliciting one or more behavioral responses in a plurality of receiver devices in response to a simplex communication signal from a transmitter device, the system comprising:

a transmitter device, the transmitter device configured for transmitting the simplex communication signal that includes an event identifier and a source identifier, the event identifier being an announcement of an event of the transmitting device, the source identifier identifying a source of the signal;

a first receiver device, the first receiver device configured to receive the simplex communication signal, determine whether the source identifier is valid, and if valid, to reference a program block, and to perform a behavior in response to the simplex communication signal, the first receiver device being different from the transmitter device; and a second receiver device, the second receiver device configured to receive the simplex communication signal, determine whether the source identifier is valid, and if valid, to reference a program block, and to perform a behavior in response to the simplex communication signal, the second receiver device being different from the transmitter device, wherein the behavior of the first receiver device is different from the behavior of the second receiver device in response to the simplex communication signal, and wherein the receiver devices do not transmit a signal to the transmitter device.

* * * * *